United States Patent [19]

Gilles

[11] Patent Number: 5,678,626
[45] Date of Patent: Oct. 21, 1997

[54] AIR CONDITIONING SYSTEM WITH THERMAL ENERGY STORAGE AND LOAD LEVELING CAPACITY

[75] Inventor: Theodore C. Gilles, Dallas, Tex.

[73] Assignee: Lennox Industries Inc., Dallas, Tex.

[21] Appl. No.: 560,376

[22] Filed: Nov. 17, 1995

Related U.S. Application Data

[63] Continuation-in-part of Ser. No. 293,875, Aug. 19, 1994, Pat. No. 5,467,812.

[51] Int. Cl.$^6$ .............................. F25B 25/00; F25B 13/00
[52] U.S. Cl. .............................. 165/62; 62/59; 62/DIG. 2
[58] Field of Search .................... 62/59, 332, DIG. 2, 62/430, 324.1; 165/62

[56] References Cited

U.S. PATENT DOCUMENTS

| | | | |
|---|---|---|---|
| 3,563,304 | 2/1971 | McGrath | 165/62 X |
| 4,044,568 | 8/1977 | Hagen | 62/73 |
| 4,135,571 | 1/1979 | Tamblyn et al. | 62/434 X |
| 4,192,146 | 3/1980 | Crede | 62/2 |
| 4,253,309 | 3/1981 | Abrahamsson et al. | 62/98 X |
| 4,256,475 | 3/1981 | Schafer | 237/28 X |
| 4,375,831 | 3/1983 | Downing, Jr. | 62/260 X |
| 4,380,156 | 4/1983 | Ecker | 62/238.7 X |
| 4,527,618 | 7/1985 | Fyfe et al. | 62/238.6 X |
| 4,608,836 | 9/1986 | MacCracken et al. | 62/235 |
| 4,645,908 | 2/1987 | Jones | 62/160 X |
| 4,671,077 | 6/1987 | Faradis | 62/324.1 |
| 4,718,248 | 1/1988 | Fisher | 62/238.7 |
| 4,735,064 | 4/1988 | Fischer | 62/430 |
| 4,753,080 | 6/1988 | Jones et al. | 62/59 |
| 4,809,516 | 3/1989 | Jones | 62/160 |
| 4,909,041 | 3/1990 | Jones | 62/99 |
| 4,916,916 | 4/1990 | Fischer | 62/430 X |
| 4,940,079 | 7/1990 | Best et al. | 165/18 X |
| 5,211,029 | 5/1993 | Uselton et al. | 62/324.5 |
| 5,255,526 | 10/1993 | Fischer | 62/59 |
| 5,307,642 | 5/1994 | Dean | 62/332 X |
| 5,467,812 | 11/1995 | Dean et al. | 165/62 |

*Primary Examiner*—William E. Wayner
*Attorney, Agent, or Firm*—W. Kirk McCord

[57] ABSTRACT

A vapor compression air conditioning (cooling and heating) system adapted for operation to reduce the consumption of electric power during peak periods of demand for power is characterized by four refrigerant circuits. A first circuit includes a compressor, a first heat exchanger and a second heat exchanger. A second circuit comprises the compressor, the first heat exchanger and a third heat exchanger. A third circuit comprises the third heat exchanger, a refrigerant pump and a thermal energy storage unit characterized by a tank having a thermal energy storage medium disposed therein. A fourth circuit includes the thermal energy storage unit, the refrigerant pump and a fourth heat exchanger. The first heat exchanger is an outdoor heat exchanger. The second and fourth heat exchangers are indoor heat exchangers in heat transfer relationship with the fluid (e.g., indoor supply air) to be cooled or heated. A first refrigerant, preferably a compressible phase change fluid, is circulated in the first and second circuits by the compressor. A second refrigerant, preferably an incompressible liquid, is circulated in the third and fourth circuits. The system is operable in plural cooling and heating modes to provide load leveling between vapor compression heating and cooling using the compressor and heating and cooling using the thermal energy storage unit, to achieve reduced power consumption during peak electrical power demand periods.

32 Claims, 4 Drawing Sheets

AIR CONDITIONING SYSTEM WITH THERMAL ENERGY STORAGE AND LOAD LEVELING CAPACITY

CROSS-REFERENCE TO RELATED APPLICATION

This application is a continuation-in-part of application Ser. No. 08/293,875, filed Aug. 19, 1994, now U.S. Pat. No. 5,467,812.

TECHNICAL FIELD

The present invention pertains to air conditioning systems with thermal energy storage and in particular to an improved air conditioning system with thermal energy storage and load leveling capacity.

BACKGROUND ART

Electric power suppliers or so-called electric utilities charge higher rates for both summer and winter peak cooling and heating conditions. For example, in warm weather conditions, peak electricity usage is usually in the afternoon hours and in the heating seasons peak electricity usage may be in the early morning hours when heating systems return to normal daytime temperature settings and electric water heaters, for example, are subject to above-normal usage. So-called thermal energy storage systems have been developed for minimizing the use of electrical energy during peak periods. U.S. Pat. Nos. 5,211,029 (to Uselton, et al), issued May 18, 1993 and 5,307,642 (to Dean), issued May 3, 1994, assigned to the assignee of the present invention, and U.S. Pat. 5,255,526 (to Fischer) issued Oct. 26, 1993 describe air conditioning systems which utilize a thermal energy storage tank having a phase change material, such as water, disposed therein. During off-peak electricity usage periods, refrigerant is circulated through a heat exchanger in the storage tank to produce ice, and during peak electricity usage periods, refrigerant is circulated between the storage tank and an indoor heat exchanger coil or evaporator by a low-power consuming pump to provide the requisite cooling effect. Thermal energy storage systems may also be used for heating, as shown in U.S. Pat. 4,645,908 (to Jones). So-called load leveling systems provide for simultaneous operation of a thermal energy storage unit and a vapor compression refrigerant circuit, as shown in U.S. Pat. No. 4,916,916 (to Fischer).

However, known types of load leveling systems do not provide for two independent indoor heat exchangers which provide cooling simultaneously from both a thermal energy storage unit and from a vapor compression refrigerant circuit. Still further, known types of load leveling systems do not provide for both heating and cooling by simultaneously operating a thermal energy storage unit and a vapor compression refrigerant circuit with respective separate indoor heat exchangers. It is to these ends that the present invention has been developed.

SUMMARY OF THE INVENTION

The present invention provides a unique load-leveling-type air conditioning system. The system includes a compressor, an outdoor heat exchanger, dual indoor heat exchangers, and a thermal energy storage unit. The thermal energy unit includes a storage tank with a phase change material, such as water, disposed in the tank and a refrigerant circulating pump for circulating refrigerant between the thermal energy storage unit and one of the indoor heat exchangers.

The thermal energy storage unit may be provided with a heating element to heat the phase change material in the tank and may be operated to act as both a heat source and a heat sink. The arrangement of the components of the system is such that the system may be operated to provide both heating and cooling of indoor air, for example, at predetermined "load" conditions while requiring approximately only one-half of the power required by conventional heating and cooling systems for meeting the same thermal load requirements.

The system is capable of being operated in at least eight different modes (four cooling modes and four heating modes), not including two transitory modes for moving the refrigerant charge to and from the thermal energy storage unit. During so-called off-peak electricity usage periods, the system is operable in a first cooling mode to circulate refrigerant through the thermal energy storage tank to cool the phase change material which, if such comprises water, is cooled sufficiently to manufacture a substantial amount of ice in the storage tank. A refrigerant liquid storage vessel may be interposed in a refrigerant circuit between the outdoor heat exchanger operating as a condenser and the storage tank to store excess refrigerant during the first cooling mode.

A second cooling mode of operation of the system is characterized by circulating refrigerant from the compressor to the outdoor heat exchanger operating as a condenser and then to one of the indoor air heat exchangers operating as an evaporator to provide direct indoor air cooling in a conventional manner.

A third cooling mode of operation of the system provides for circulation of refrigerant between the storage tank and one of the indoor air heat exchangers operating as an evaporator by a liquid pump having substantially reduced power requirements while providing approximately half of the total cooling capacity of the system.

In accordance with yet a further aspect of the invention, the system may be operated in a fourth cooling mode wherein full capacity cooling is provided by circulating refrigerant from the compressor through the outdoor heat exchanger operating as a condenser and one of the indoor air heat exchangers operating as an evaporator while, simultaneously, refrigerant is circulated through a circuit which includes the storage tank and the other one of the indoor air heat exchangers operating as an evaporator by way of the refrigerant circulating pump. In this mode of operation, full cooling capacity of the system is provided at approximately one-half of the electrical power which would be required of a conventional vapor compression refrigeration or air conditioning system.

Still further, the invention provides for four heating modes of operation, including a first heating mode wherein an electrical resistance heating element, for example, disposed in the thermal energy storage tank, is operated during off-peak electrical usage periods to heat the phase change material in the storage tank. In a second heating mode of operation, direct heat generation is provided by the compressor, the condenser and one of the indoor heat exchangers operating in a reverse or so-called heat pump mode wherein one of the indoor heat exchangers is used as a condenser and the outdoor heat exchanger functions as an evaporator.

The invention provides a third heating mode wherein refrigerant fluid is heated by the phase change material in the thermal energy storage tank and the refrigerant fluid is circulated by the pump to one of the indoor heat exchangers to provide heating of the indoor air. Still further, the invention provides a fourth heating mode in which the system is capable of full capacity heating wherein refrigerant is circulated between the compressor and one of the indoor heat exchangers in the heat pump mode while simultaneously refrigerant is circulated between the thermal energy storage tank and the other indoor heat exchanger to provide full capacity heating.

The system provides several advantages which will be recognized by those of skill in the art. In particular, a system is provided wherein both cooling and heating requirements are met with approximately one-half of the electrical power requirements of conventional vapor compression air conditioning systems or heat pumps. The system provides load-leveling in both cooling and heating operations to take advantage of off-peak electrical power pricing. High capacity cooling requirements are met by the thermal energy storage unit and by the plural indoor cooling load heat exchangers. In a similar manner, high capacity heating requirements are met by the thermal energy storage tank supplying heat by way of one of the indoor air heat exchangers and the other indoor heat exchanger also functions as a condenser while the system is operating as a heat pump. Peak cooling and heating loads can be easily met with the system of the invention while requiring substantially reduced electrical power demand. The system may be used in place of conventional commercial and residential heat pumps which use electrical resistance-type heating elements, for example, to meet peak heat load requirements. Those skilled in the art will further appreciate the above-mentioned features and advantages of the invention together with other superior aspects thereof upon reading the detailed description which follows in conjunction with the drawing.

BEST MODE FOR CARRYING OUT THE INVENTION

Figure 1:
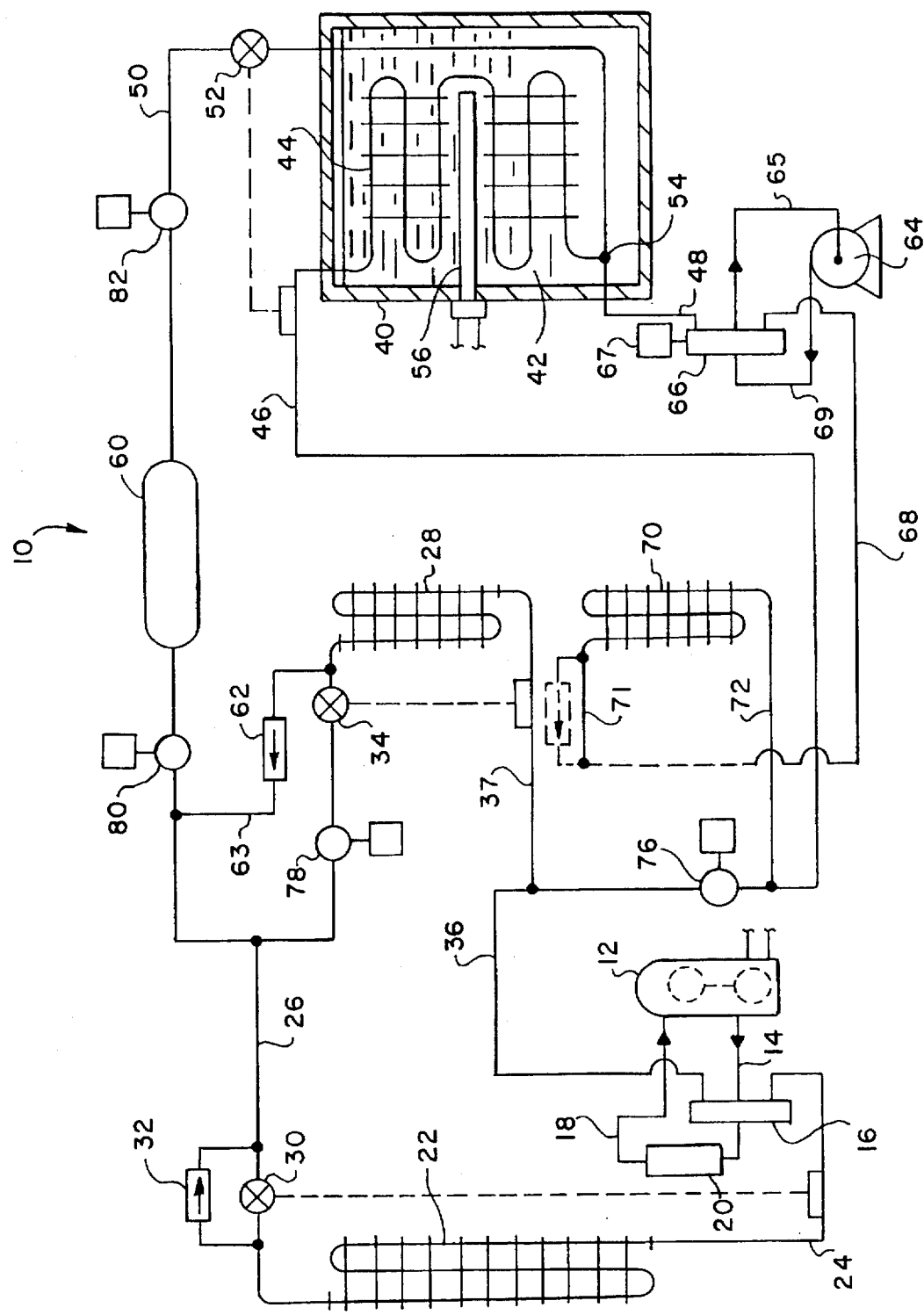
FIG. 1 is a schematic diagram of a first embodiment of an air conditioning system of the present invention.

In the description which follows, like elements are marked throughout the specification and drawing with the same reference numerals, respectively. The drawing figure is not to scale and most of the elements are shown in schematic form in the interest of clarity and conciseness.

Referring to FIG. 1, there is illustrated in schematic form an improved air conditioning (cooling and heating) system in accordance with the invention and generally designated by the numeral 10. The system 10 is adapted to operate with conventional refrigerant fluids used for commercial and residential cooling systems. The system 10 includes a motor driven compressor 12, connected to a compressed gas discharge line 14, which is connected to a conventional four-way reversing valve 16. The compressor 12 also has a low-pressure vapor or gaseous refrigerant fluid suction or inlet line 18 which is connected to the reversing valve 16 by way of a conventional suction line accumulator 20. A first refrigerant-to-air heat exchanger 22 (which is preferably located outdoors) is suitably connected to the reversing valve 16 by a conduit 24 and by way of a conduit 26 to a second refrigerant-to-air heat exchanger 28, which is located indoors in heat exchange relationship with an indoor space to be conditioned. A conventional superheat controlled or thermostatic-type thermal expansion device 30 and a check valve 32 are operably interposed in the conduit 26 to allow the heat exchanger 22 to operate as an evaporator in a heat pump operating mode. A second thermostatic-type thermal expansion device 34 is interposed in the conduit 26 upstream of the heat exchanger 28, which operates as an evaporator when the system is operating to provide cooling to indoor air, for example, flowing over the heat exchanger 28. Refrigerant fluid is returned to the compressor from the heat exchanger 28 by way of conduits 36, 37 and the reversing valve 16. The aforementioned portion of the system 10 forms a first refrigerant circuit.

The system 10 also includes a thermal energy storage unit comprising an insulated tank 40, which is operable to contain a quantity of suitable phase change material such as water 42. The thermal energy storage unit may be adapted for refrigeration applications. For example, glycol or salt may be added to water 42 to lower the freezing temperature substantially below 32° F., for example, to approximately 20° F. When operated with a standard refrigeration system (not shown) instead of an air conditioning system, evaporating temperatures on the order of 33° F. (instead of 45° F. for an air conditioning system) may be achieved, which is suitable for refrigeration applications. A third heat exchanger 44 is immersed in the water 42 within the tank 40 and is connected to a refrigerant fluid transfer conduit 46, a second refrigerant fluid transfer conduit 48 and a third conduit 50 having a conventional thermal expansion device 52 interposed therein. The conduit 50, heat exchanger 44 and conduit 48 are interconnected at a suitable junction 54 within the tank 40. The above-described thermal energy storage unit also includes a heating element 56 suitably disposed within the tank 40. The heating element 56 may be a conventional electrical resistance heater operably connected to a source of electrical power (not shown). The conduit 50 is connected to the conduit 26 and has interposed therein a refrigerant liquid storage vessel 60 for storing excess refrigerant during certain operating modes of the system 10. A suitable by-pass-type check valve 62 is interposed in a conduit 63 interconnecting the conduit 26 and the conduit 50 as illustrated. The compressor 12, heat exchanger 22, conduits 26 and 50, heat exchanger 44 and conduits 46 and 36 form a second refrigerant circuit of the system 10.

The system 10 still further includes a liquid circulation pump 64 operably connected to the conduit 48 by a four-way reversing valve 66, which may be similar in some respects to the reversing valve 16 but is preferably provided with a solenoid operator 67 for shifting the valve to provide fluid flow in the directions to be described herein. The four-way valve 66 is also connected to a conduit 68, which is in communication with a fourth heat exchanger 70 (also a refrigerant-to-air heat exchanger), which is located indoors in heat exchange relationship with the space to be conditioned and is operable to provide cooling or heating of air passing thereover, in a conventional manner. The pump 64 has an inlet or suction conduit 65 and discharge conduit 69 suitably connected to the valve 66. The heat exchanger 70 is in communication with the conduits 36, 46, by way of a suitable connecting conduit 72. As previously described, the conduit 36 is also in communication with the heat exchanger 28 by connecting conduit 37 and with the heat exchanger 44 in the tank 40 by way of the conduit 46, as illustrated. A short portion 71 of conduit 68 may comprise a capillary tube expansion device or a conventional thermostatic expansion device and bypass valve may be interposed in conduit 71.

The system 10 is also provided with four on-off-type solenoid operated valves 76, 78, 80 and 82. The valves 80 and 82 are interposed in the conduit 50 on opposite sides of the liquid refrigerant storage vessel 60 while the valve 76 is interposed in the conduit 46 between the conduit 72 and the conduits 36, 37. The solenoid valve 78 is interposed in the conduit 26 between the expansion device 30 and the expansion device 34. The heat exchanger 44, pump 64, valve 66, heat exchanger 70 and connecting conduits 48, 65, 68, 69, 72 and 46 form a third refrigerant circuit.

The system 10 may utilize several conventional elements which have been previously described in somewhat general terms. The compressor 12 may be a conventional motor driven compressor of a type well known for use in vapor compression refrigeration or air conditioning systems. In like manner, the reversing valve 16 may be conventional and the expansion devices 30, 34 and 52 may be conventional superheat controlled expansion devices, as illustrated. Heat exchanger 22 may be an outdoor refrigerant-to-air heat exchanger, such as a serpentine coil having suitable finned heat exchange surfaces and operable to have air circulated thereover by a suitable motor-driven fan (not shown). Heat exchanger 22 may also be of a type which is in communication with another heat source or heat sink (not shown). The heat exchangers 28 and 70 may be conventional indoor air evaporator coil-type heat exchangers, wherein air is circulated thereover by suitable fans (also not shown). The insulated tank 40 may be of generally conventional construction for pressure vessels and the serpentine coil-type heat exchanger 44 disposed therein may also be of generally conventional construction. The pump 64 should be of a type which is adapted to pump a mixed phased fluid, gas and liquid, without potential for damage to the pump. Certain types of rotary vane or helical screw-type pumps may be utilized for the pump 64.

The modes of operation of the system 10 will now be described in conjunction with Table I, which indicates the operating condition of certain elements of the system including the compressor 12, the heating element 56, the pump 64, and the solenoid valves 76, 78, 80 and 82.

TABLE I

| | Item | | | | | | |
|---|---|---|---|---|---|---|---|
| Mode | 12 | 56 | 64 | 76 | 78 | 80 | 82 |
| 1 | 1 | 0 | 0 | 1 | 0 | 1 | 1 |
| 2 | 1 | 0 | 0 | 0 | 1 | 0 | 0 |
| 3 | 0 | 0 | 1 | 0 | 0 | 0 | 1 |
| 4 | 1 | 0 | 1 | 0 | 1 | 0 | 1 |
| 5 | 0 | 1 | 0 | 0 | 0 | 0 | 0 |
| 6 | 1 | 0/1 | 0 | 0 | 0 | 0 | 0 |
| 7 | 0 | 0 | 1 | 0 | 0 | 0 | 0 |
| 8 | 1 | 0 | 1 | 0 | 0 | 0 | 0 |
| HM | 0 | 0 | 0 | 1 | 1 | 0 | 1 |
| PO | 1 | 0 | 0 | 1 | 0 | 1 | 0 |

The operating modes are indicated as nos. 1 through 8, and two temporary modes are indicated and designated hypermigration (HM) and pumpout (PO). A "0" in regard to an operating mode of a particular element indicates that the element is in a closed, off or de-energized condition and a "1" in regard to a particular operating mode indicates that the element is in an open, on or energized condition, respectively.

Operating mode 1 is typically a summertime or hot weather mode of operation during off-peak electrical demand periods wherein so-called ice-making is provided for the phase change material 42 which is converted from a liquid to a solid, for example. In operating mode 1, the compressor 12 is operating, the heating element 56 is not operating, the pump 64 is not operating, the solenoid valve 78 is closed and solenoid valves 76, 80 and 82 are open. Compressed gas refrigerant leaves the compressor 12 and flows through the reversing valve 16 and conduit 24 to heat exchanger 22, which operates as a condenser. The condensed refrigerant flows through the bypass valve 32, conduits 26 and 50, the expansion device 52 and into the heat exchanger coil 44, which operates as an evaporator. Refrigerant, of course, leaves the expansion device 52 at a reduced pressure and cools the phase change material, such as water, 42 in the tank 40. Evaporated refrigerant is pulled back through conduit 46, valve 76 and conduit 36 to the compressor 12 by way of the reversing valve 16. During this operating mode, some excess liquid refrigerant is stored in storage vessel 60.

Operating mode 2 is sometimes known as first-stage direct cooling and is characterized by operation of the compressor 12 to deliver high pressure gaseous refrigerant by way of the reversing valve 16 and the conduit 24 to the heat exchanger 22, which operates as a condenser. Condensed refrigerant flows through the by-pass valve 32 to heat exchanger 28, which is now operating as an evaporator coil. Accordingly, valve 78 is open and the thermal expansion device 34 is operable to reduce the pressure of the liquid refrigerant as it enters the heat exchanger 28. Evaporated refrigerant returns to the compressor via conduits 37, 36 and valve 16. In the direct cooling operating mode 2, valves 76, 80 and 82 are closed and neither the pump 64 nor the heating element 56 are in operation during the steady state portion of the direct cooling operating mode. In the direct cooling mode 2, the system 10 is operating at approximately one-half of its total cooling capacity.

A third operating mode, designated as mode 3, and also known as first-stage shift cooling is carried out by shutting down the compressor 12 and starting the pump 64 while closing valves 76, 78 and 80 and opening valve 82. The four-way valve 66 is positioned such that liquid refrigerant will move from pump 64 through conduit 68, the heat exchanger 70, the conduit 72, the conduit 46 and the heat exchanger 44 back to the pump. Refrigerant is drawn out of the heat exchanger 44 by way of the con&it 48 and the four-way valve 66 to the pump inlet by way of conduit 65. Solenoid valve 82 is left open only long enough to draw sufficient refrigerant into the heat exchanger 44 to provide a full charge of refrigerant to circulate in the manner just described. As refrigerant passes through the heat exchanger 70, it evaporates and returns to the heat exchanger 44 where the low temperature of the medium 42 will cause the refrigerant to again condense into liquid form for circulation by the pump 64. The capacity of the system 10, in the operating mode 3, usually may be the same as in operating mode 2. However, an important advantage of operating mode 3 is that the power required for operating the pump 64 is on the order of 10–20% of the power required to operate the compressor 12. Heat exchanger 70 operates as an evaporator and heat exchanger 44 operates as a condenser in operating mode 3. Storage vessel 60 has sufficient storage capacity to store the amount of refrigerant required to support mode 3 operation.

In order to pass from operating too& 2 to operating mode 3, also known as the shift cooling mode, the system 10 operates in a transition mode known as hypermigration (HM). The hypermigration cycle usually takes a relatively short time, about three to five minutes, in a system having about 10 tons cooling capacity. In the hypermigration mode, the heat exchanger 44 is utilized as a heat sink at about 32° F., or at the freezing point of the phase change medium 42 if it is other than fresh water. Refrigerant fluid in the heat exchanger 44 condenses and the pressure within the system 10 decreases. Since refrigerant fluid throughout the rest of the system 10 is at a much higher pressure and temperature, a refrigerant fluid charge is drawn into the heat exchanger 44 during the hypermigration mode. Table I shows the operating condition of the items listed during hypermigration.

The system 10 is advantageously operable to accept a cooling load that requires the compressor 12, heat exchanger 22 operating as a condenser and heat exchanger 28 operating as an evaporator in the same manner as in mode 2, while simultaneously operating the thermal energy storage tank 40 in conjunction with heat exchanger 70 operating as an evaporator and heat exchanger 44 operating as a condenser in the same manner as in mode 3. Accordingly, a full load capacity mode 4 operating condition may be sustained by the system 10. When transitioning from the so-called shift cooling mode 3 to the full load capacity mode 4 or when starting full load capacity mode 4 with a sufficient charge of ice or solid phase condition of the medium 42, mode PO is carried out wherein valves 78 and 82 are closed, valves 76 and 80 are open and compressor 12 is operated to pull liquid refrigerant into receiver vessel 60 and heat exchanger 22. Compressor 12 is operated until the compressor suction pressure reaches a predetermined valve (e.g., 20 psig). At this time, mode PO is concluded and the system is operable in mode 4.

In mode 4, valve 80 is closed while valves 78 and 82 are opened and valve 76 is closed. The pump 64 is started to circulate refrigerant through the heat exchanger 70 and the heat exchanger 44 to provide cooling effect to air passing over the heat exchanger 70. The compressor 12 is operated in a conventional manner to pump refrigerant through the reversing valve 16, conduit 24, heat exchanger 22 and through the heat exchanger 28 to cool air passing over heat exchanger 28. Table I also shows the operating condition of the various elements in the full load capacity mode 4. The system 10 may, of course, be operated in the full load capacity mode 4 until all of the ice in the tank 40 is melted or the medium 42, if other than fresh water, has changed its phase from solid to liquid and the temperature of the liquid has begun to rise sufficiently that heat exchanger 70 is no longer effecting sufficient cooling to meet the load requirements. In mode 4, heat exchangers 28, 70 provide a dual evaporator capability for simultaneous operation of compressor 12 and pump 64, whereby direct cooling and shift cooling are operated in parallel.

The system 10 is also advantageously operable to provide for heating indoor air or the load associated with the heat exchangers 28 and 70. The various operating con&ions or modes in which the system 10 may be operated to provide heat at the heat exchangers 28 and 70 will now be described. The first heating mode is designated as mode 5 and is that in which, during off-peak electricity demand periods, the heating element 56 is used to heat the phase change material or medium 42 to a suitable temperature. For example, if the material 42 is fresh water, the heating element 56 may be operated to heat the water to a temperature in the range of 180° F. to 190° F. In this operating condition, any refrigerant in the heat exchanger 44 and the conduits connected thereto will tend to migrate to the heat exchanger 70. Typically, in operating mode 5, the valves 76, 78, 80 and 82 are closed, the compressor 12 is in an off condition and the pump 64 is in an off condition.

The system 10 may be operated in mode 6, also known as the direct heating mode, while operating in mode 5 or not operating in mode 5, as the choice may be. In the direct heating mode 6, the compressor 12, reversing valve 16, heat exchanger 22 and heat exchanger 28 are operated in the manner of a conventional heat pump. In other words, the reversing valve 16 is positioned such that high pressure refrigerant gas discharged from the compressor 12 passes through conduit 36, conduit 37 and gives up heat to the medium passing over the heat exchanger 28, which now operates as a condenser, to condense the refrigerant, which then flows as a liquid through check valve 62 and conduit 26. The thermostatic expansion device 30 reduces the pressure of the refrigerant as it passes through heat exchanger 22, now operating as an evaporator. Gaseous refrigerant leaving the heat exchanger 22 passes through the reversing valve 16 and into the compressor 12 inlet by way of conduit 18.

An alternative heating mode 7 may be carried out in place of mode 6, referring to Table I, wherein the compressor 12 is in an off condition and the heating element 56 is de-energized while the pump 64 is energized to circulate refrigerant fluid between the heat exchanger 70 and the heat exchanger 44. In operating mode 7, which may also be designated as first stage shift heating, the electrical power requirement of system 10 is only that which is required to circulate the refrigerant fluid with the pump 64, that is on the order of 10% to 20% of the power requirements of the compressor 12. In heating mode 7, refrigerant fluid is drawn from the heat exchanger 70, through the conduit 68 to the valve 66 which has been positioned to provide for the conduit 68 to be in communication with the inlet of pump 64. This position of valve 66 places the conduit 48 in communication with the heat exchanger 44 so that liquid refrigerant enters the heat exchanger 44 and is evaporated by the heated material 42. Hot gaseous refrigerant leaves the heat exchanger 44 and flows through conduit 46 and through the heat exchanger 70, which now operates as a condenser, by way of conduit 72, whereupon the fluid condenses back to liquid form and is again circulated by the pump 64. Assuming 90° F. of usable heat storage in the tank 40, the cool storage to heat storage ratio of the thermal energy storage unit is about 1.33.

A final operating mode of the system 10 is that wherein, essentially, modes 6 and 7 are carried out simultaneously as mode 8. That is, the compressor 12 is operated in the heat pump mode to supply hot gaseous refrigerant fluid to the heat exchanger 28 and the pump 64 is operating to circulate refrigerant fluid through the tank 40 and to the heat exchanger 70 in a hot gaseous form. Placing the system 10 in condition to operate in modes 6, 7 or 8 may require brief operation in the hypermigration or pump-out mode to place a sufficient charge of refrigerant in the respective circuits which are operable in modes 6, 7 and 8. In mode 8, heat exchangers 28, 70 provide a dual condenser capability for simultaneous operation of compressor 12 and pump 64, whereby direct heating and shift heating are operated in parallel.

Figure 2:
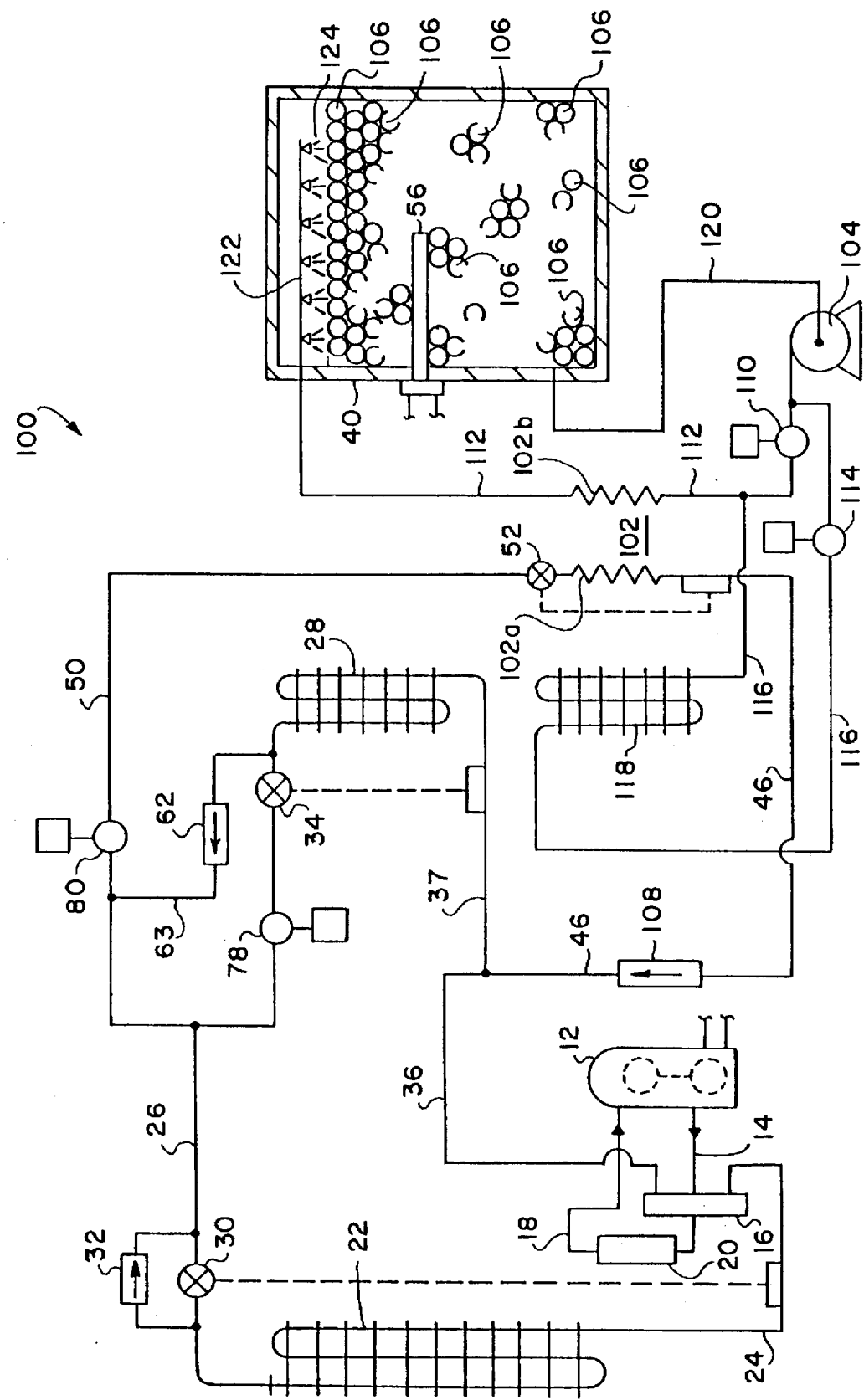
FIG. 2 is a schematic diagram of a second embodiment of an air conditioning system of the present invention.

Referring to FIG. 2, a second embodiment of an air conditioning system according to the present invention, generally designated by the numeral 100, is depicted. System 100 has a similar configuration to system 10, described hereinabove with reference to FIG. 1, the primary difference being that system 100 includes a heat exchanger 102 which is external to storage tank 40, instead of a heat exchanger 44 (FIG. 1) which is immersed in the storage medium within tank 40, and a pump 104 suitable for pumping a substantially incompressible liquid refrigerant instead of pump 44, which is suitable for pumping a vapor compression refrigerant. Further, in system 100, the storage medium (e.g., deionized water) is encapsulated in a plurality of containers 106, which are preferably plastic spheres each having a diameter of approximately four inches. Isolation valves 76 and 82, reversing valve 66 and solenoid operator 67 of system 10 are not present in system 100. System 100 includes a check valve 108 in conduit 46, an on-off-type solenoid operated valve 110 in a conduit 112 between pump 104 and heat exchanger 102, and an on-off-type solenoid operated valve 114 in a conduit 116 between pump 104 and an indoor heat exchanger 118, which is in heat exchange relationship with an indoor space to be cooled or heated.

In contrast to system 10, system 100 has four discrete refrigerant circuits, instead of the three circuits of system 10, and two discrete refrigerants, one of which is not a vapor compression refrigerant, instead of the one vapor compression refrigerant used in system 10. A first circuit of system 100 is comprised of compressor 12, reversing valve 16, heat exchanger 22 and heat exchanger 28. A first refrigerant, which is preferably a vapor compression refrigerant, is circulated by compressor 12 through the first circuit when system 100 is operating in modes 2 (direct cool), 4 (full load cooling), 6 (direct heating) and 8 (full load heating), as will be described in greater detail hereinafter. A second circuit of system 100 is comprised of compressor 12, reversing valve 16, heat exchanger 22 and heat exchanger 102. Compressor 12 is operable to circulate the first refrigerant between heat exchangers 22 and 102 when system 100 is operating in mode 1 (ice making), as will be described in greater detail hereinafter.

A third circuit of system 100 is comprised of pump 104, heat exchanger 102 and tank 40. Pump 104 is operable to circulate a second refrigerant, which is preferably a substantially incompressible liquid such as a mixture of potassium acetate and water, in the third circuit, simultaneously with the first refrigerant being circulated in the second circuit when system 100 is operating in mode 1 (ice making), as will be described in greater detail hereinafter. The first refrigerant is evaporated in heat exchanger 102 and cools the second refrigerant, which is circulated through tank 40 to cool the storage medium until the storage medium freezes. The second refrigerant has a lower freezing point than the storage medium. A fourth circuit of system 100 is defined by tank 40, pump 104 and heat exchanger 118. Pump 104 circulates the second refrigerant between tank 40 and heat exchanger 118 when system 100 is operating in modes 3 (shift cooling), 4 (full load cooling), 7 (shift heating) and 8 (full load heating).

The modes of operation of system 100 will now be described in greater detail in conjunction with Table II, which indicates the operating condition of certain elements of system 100 during each of the operating modes.

TABLE II

| Mode | Item | | | | | | |
|---|---|---|---|---|---|---|---|
| | 12 | 56 | 78 | 80 | 104 | 110 | 114 |
| 1 | 1 | 0 | 0 | 1 | 1 | 1 | 0 |
| 2 | 1 | 0 | 1 | 0 | 0 | 0 | 0 |
| 3 | 0 | 0 | 0 | 0 | 1 | 0 | 1 |
| 4 | 1 | 0 | 1 | 0 | 1 | 0 | 1 |
| 5 | 0 | 1 | 0 | 0 | 0 | 0 | 0 |
| 6 | 1 | 0/1 | 0 | 0 | 0 | 0 | 0 |
| 7 | 0 | 0 | 0 | 0 | 1 | 0 | 1 |
| 8 | 1 | 0 | 0 | 0 | 1 | 0 | 1 |

The operating modes are designated as Nos. 1 through 8. A "0" in regard to an operating mode of a particular element indicates that the element is in a closed, off or de-energized condition and a "1" in regard to an operating mode of a particular element indicates that the element is in an open, on or energized condition, respectively.

As previously described, operating mode 1 typically is a summertime or hot weather mode of operation during off-peak electrical demand periods wherein so-called ice-making is provided for the storage medium (e.g., deionized water) in plastic spheres 106 to be converted from a liquid to a solid. In operating mode 1, compressor 12 is operating, heating element 56 is not operating, pump 104 is operating, solenoid valve 78 is closed, solenoid valve 80 is open, solenoid valve 110 is open and solenoid valve 114 is closed. The first refrigerant is circulated by compressor 12 in the second circuit and simultaneously therewith, the second refrigerant is circulated by pump 104 in the third circuit.

Compressed first refrigerant leaves compressor 12 in a vapor state and flows through reversing valve 16 and conduit 24 to heat exchanger 22, which operates as a condenser. The condensed first refrigerant flows through by-pass valve 32, conduits 26, 50 and expansion device 52, and into a first coil 102a of heat exchanger 102. The first refrigerant leaves heat exchanger 102 substantially in a vapor state and flows via conduit 46, check valve 108, conduit 36 and reversing valve 16 back to compressor 12. The second refrigerant is circulated by pump 104 through conduits 112 and 120, between heat exchanger 102 and tank 40. The second refrigerant flows through a second coil 102b of heat exchanger 102, which is in heat exchange relationship with coil 102a. Heat is transferred from the second refrigerant to the first refrigerant as the first and second refrigerants flow through heat exchanger 102, thereby chilling the second refrigerant and evaporating the first refrigerant. The chilled second refrigerant flows through conduit 112 into diffuser header 122 inside tank 40, whereupon the second refrigerant is discharged in a spray pattern 124 through spaced apart apertures in diffuser header 122. The chilled second refrigerant percolates down through tank 40, cooling the storage medium within containers 106. System 100 preferably is operated in mode 1 until the storage medium freezes. The first refrigerant changes phase during mode 1 operation, but the second refrigerant does not.

Operating mode 2, which is referred to as first-stage direct cooling, is substantially the same as described hereinabove with reference to FIG. 1 and Table I. The first refrigerant is circulated by compressor 12 in the first circuit. Compressor 12 delivers compressed first refrigerant in a vapor state by way of reversing valve 16 and conduit 24 to heat exchanger 22, which operates as a condenser. Condensed first refrigerant flows through by-pass valve 32 to heat exchanger 28, which is now operating as an evaporator coil. Valve 78 is now open and valve 80 is closed. Thermal expansion device 34 is now operable to reduce the pressure of the liquid first refrigerant as it enters heat exchanger 28. The first refrigerant is evaporated in heat exchanger 28 to cool fluid (e.g., a supply air stream for an indoor space) passing through heat exchanger 28. The evaporated first refrigerant returns to compressor 12 via conduits 37, 36 and reversing valve 16. In operating mode 2, neither pump 104 nor heating element 56 is in operation and valves 110 and 114 are closed. Check valve 108 prevents the first refrigerant from back flowing into conduit 46. In operating mode 2, system 100 is operating at approximately one-half of its total cooling capacity. Operating mode 2 is preferably confined to periods of off-peak electrical power demand because of the electrical power required to operate compressor 12.

In operating mode 3, also known as first-stage shift cooling, compressor 12 is not operated and pump 104 circulates the second refrigerant in the fourth circuit. In this mode of operation, the second refrigerant flows between tank 40 and heat exchanger 118 via conduits 120, 116 and 112. The second refrigerant is chilled by the storage medium as it percolates down through tank 40 and cools fluid (e.g., indoor supply air) passing through heat exchanger 118 as the chilled second refrigerant flows through heat exchanger 118. In mode 3, valve 110 is closed to prevent the second refrigerant from flowing through heat exchanger 102 and value 114 is open to allow the second refrigerant to flow through heat exchanger 118.

The capacity of system 100 in operating mode 3, usually may be the same as in operating mode 2. However, an important advantage of operating mode 3 is that the power required for operating pump 104 is on the order of 10–20% of the power required to operate compressor 12. Therefore, operating mode 3 is advantageous during periods of peak electrical power demand.

One skilled in the art will recognize that it is not necessary to operate system 100 in the hypermigration (HM) mode described hereinabove with reference to FIG. 1 when transitioning between operating modes 2 and 3 because the first and fourth circuits are isolated from each other and each circuit has its own discrete refrigerant. Specifically, the first refrigerant, which is a vapor compression fluid and changes phase in mode 2 operation, is circulated in the first circuit while the second refrigerant, which is a substantially incompressible liquid and does not change phase in mode 3 operation, is circulated in the fourth circuit.

In operating mode 4, the first refrigerant is circulated in the first circuit simultaneously with the second refrigerant being circulated in the fourth circuit. Operating mode 4 is essentially simultaneous operation of modes 2 and 3 to achieve full load capacity. In mode 4, valves 80 and 110 are closed and valves 78 and 114 are open. As in mode 2, compressor 12 is operated to circulate the first refrigerant between heat exchanger 22 operating as a condenser and heat exchanger 28 operating as an evaporator to cool fluid (e.g., indoor supply air) passing through heat exchanger 28. At the same time, pump 104 circulates the second refrigerant between tank 40 and heat exchanger 118 with the cooling capacity of the storage medium in tank 40 being used to chill the second refrigerant and provide cooling for the fluid (e.g., indoor supply air) passing through heat exchanger 118. System 100 may be operated in the full load capacity mode until the storage medium encapsulated in containers 106 has changed its phase from solid to liquid and the temperature of the liquid storage medium has begun to rise sufficiently that heat exchanger 118 is no longer effecting sufficient cooling to meet the load requirements. In mode 4, indoor heat exchangers 28, 118 provide full capacity cooling for air supplied to an indoor space. Compressor 12 and pump 104 are operated simultaneously, whereby the direct cooling and shift cooling modes are operated in parallel.

One skilled in the art will recognize that it is not necessary to operate system 100 in the pumpout (PO) mode described hereinabove with reference to FIG. 1, when transitioning from mode 3 to mode 4 or when starting mode 4 for the same reason that the hypermigration (HM) mode is not necessary, as described hereinabove.

System 100 is also operable to provide for heating supply air for an indoor space. The various operating conditions and modes in which system 100 may be operated to provide heat at heat exchangers 28, 118 will now be described.

The first heating mode is designated as mode 5 and is essentially the same as mode 5 described hereinabove with respect to FIG. 1. During off-peak electricity demand periods, heating element 56 is used to heat the second refrigerant in tank 40. The second refrigerant in tank 40 heats the storage medium encapsulated in containers 106 to a suitable temperature. For example, if the storage medium is deionized water, heating element 56 may be operated to heat the water to a temperature in the range of 180° F. to 190° F. Typically, in operating mode 5, valves 78, 80, 110 and 114 are closed, compressor 12 is in an off condition and pump 104 is in an off condition. During mode 5, warm thermal energy storage is effected.

System 100 may be operated in mode 6, also known as the direct heating mode, either while still operating in mode 5 or not operating therein, as the case may be. In mode 6, the first refrigerant is circulated in the first circuit, but in an opposite direction from the direction of circulation in mode 2, to effect heat pump operation. Compressor 12, reversing valve 16, heat exchanger 22, and heat exchanger 28 are operated in the manner of a conventional heat pump. Reversing valve 16 is positioned such that the first refrigerant discharged in a vapor state at high pressure from compressor 12 passes through conduits 36, 37 and gives up heat to the fluid (e.g., indoor supply air) passing through heat exchanger 28, which now operates as a condenser to condense the first refrigerant, thereby heating the fluid passing through heat exchanger 28. The condensed first refrigerant then flows through check valve 62 and conduit 26. Thermal expansion device 30 reduces the pressure of the first refrigerant as it passes through heat exchanger 22, now operating as an evaporator. The vaporized first refrigerant leaving heat exchanger 22 passes through reversing valve 16 and into compressor 12 by way of conduit 18. System 100 is typically operated in mode 6 during off-peak electrical demand periods.

During peak electrical demand periods, it is advantageous to provide heating by operating system 100 in mode 7 instead of mode 6. In mode 7, compressor 12 is in an off condition and heating element 56 is de-energized, while pump 104 is energized to circulate the second refrigerant between heat exchanger 118 and tank 40. In operating mode 7, which is designated as first stage shift heating, the electrical power requirement of system 100 is only that which is required to circulate the second refrigerant with pump 104, that is on the order of 10–20% of the power requirements of operating compressor 12. In mode 7, the second refrigerant is circulated in the fourth circuit. Valves 78, 80 and 110 are closed and valve 114 is open. The second refrigerant flows through conduits 120, 116 and 112 between heat exchanger 118 and tank 40. The second refrigerant picks up heat from the heated storage medium and carries the thermal energy to heat exchanger 118 wherein fluid (e.g., indoor supply air) passing through heat exchanger 118 is heated.

Operating mode 8 is essentially simultaneous operation of system 100 in mode 6 and mode 7. That is, compressor 12 is operated in the heat pump mode to supply a hot gaseous first refrigerant to heat exchanger 28 and pump 104 is operated to circulate the second refrigerant between tank 40 and heat exchanger 118 to provide heated second refrigerant to heat exchanger 118. As previously described, it is not necessary to operate system 100 in either the hypermigration or the pumpout mode prior to operating system 100 in either modes 6, 7 or 8. In mode 8, heat exchangers 28, 118 provide full heating capacity of system 100, whereby direct heating and shift heating are operated in parallel.

Figure 3:
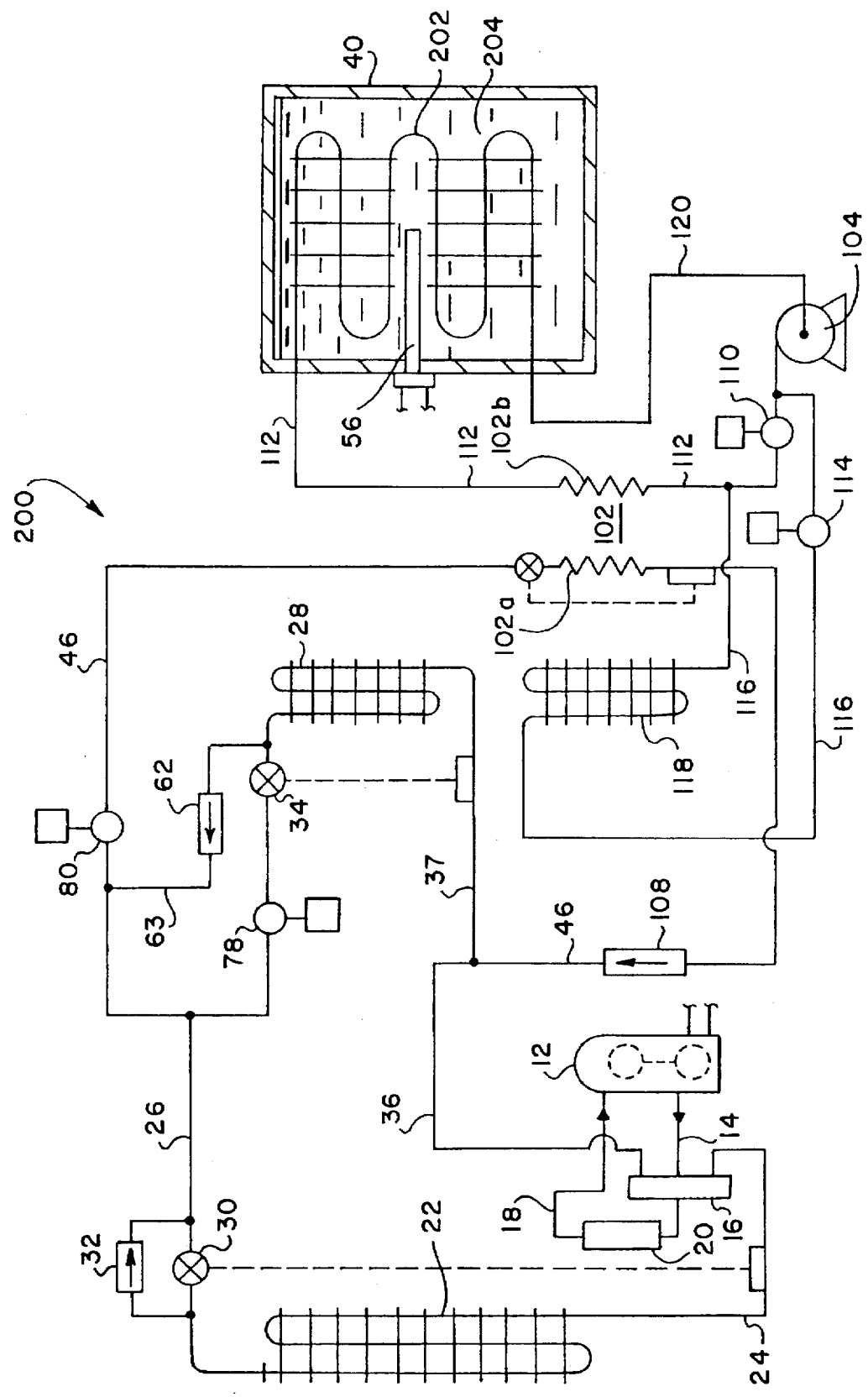
FIG. 3 is a schematic diagram of a third embodiment of an air conditioning system of the present invention.

Referring to FIG. 3, a third embodiment of an air conditioning system according to the present invention is depicted. System 200 is substantially the same as system 100, described hereinabove with reference to FIG. 2 and Table II, except that system 200 includes a fifth heat exchanger 202, which is immersed in a thermal energy storage medium 204 within tank 40. Storage medium 204 is a phase change material (e.g., water) having a higher freezing point than the second refrigerant. In system 200, storage material 204 is not encapsulated in containers as in system 100, but is rather constrained only by the shape of tank 40. System 200 is also operable in eight discrete modes as depicted in Table II. Table II also shows the respective conditions of the various elements of system 200 in the eight different operating modes. These conditions are the same as in system 100 so that Table II is applicable to both the operation of system 100 and the operation of system 200. Heat exchanger 202 is preferably a coil comprising multiple passes through tank 40. Diffuser header 122 of system 100 is not included in system 200.

In operating mode 1 (ice making), the second refrigerant cools storage medium 204 as the second refrigerant makes multiple passes through heat exchanger 202. In operating modes 3 and 4, the second refrigerant is cooled by storage medium 204 as it makes multiple passes through heat exchanger 202. In operating modes 7 and 8, the second refrigerant is heated by storage medium 204 as the second refrigerant makes multiple passes through heat exchanger 202.

Figure 4:
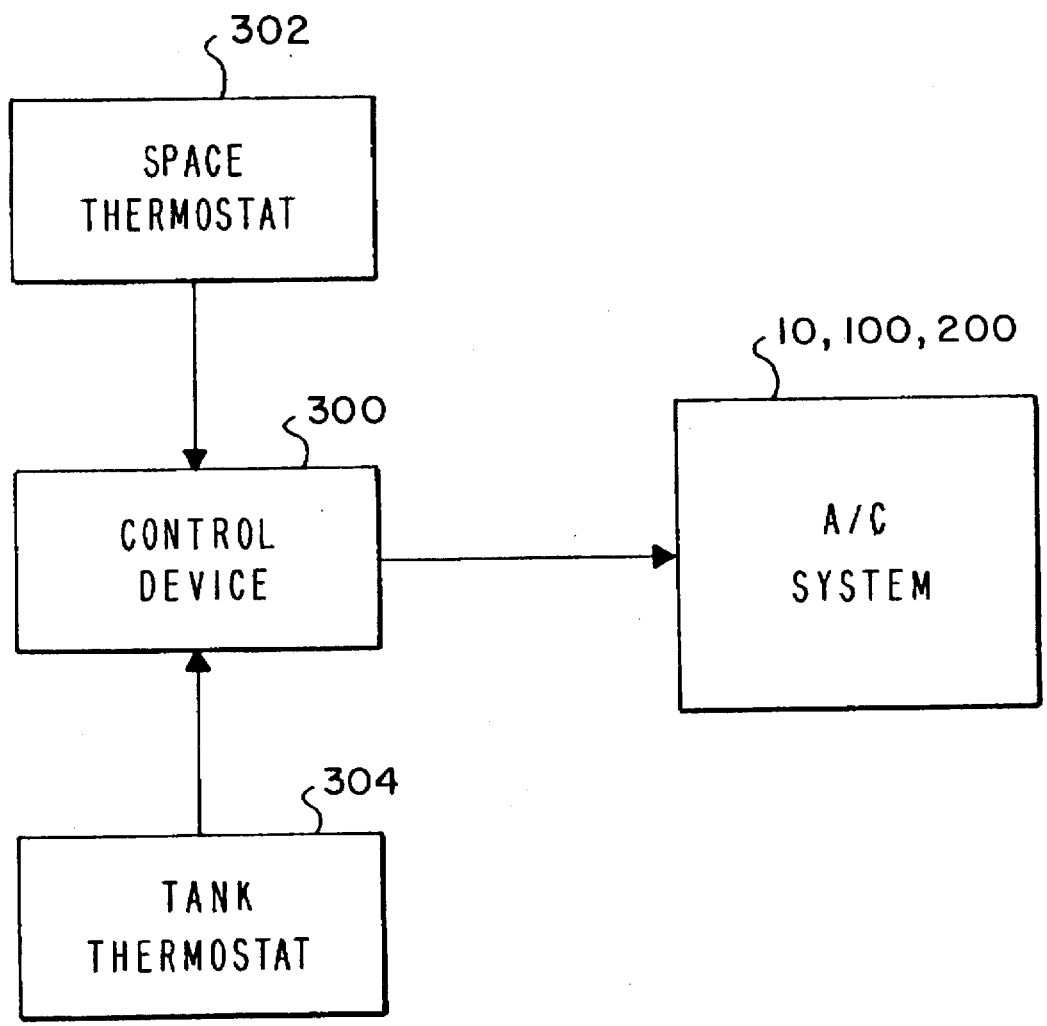
FIG. 4 is a simplified block diagram illustrating control of the air conditioning system of the present invention.

Referring to FIG. 4, one skilled in the art will recognize that each system 10, 100, 200 is provided with a suitable control device for sensing the load requirements of the corresponding system 10, 100, 200 in both cooling and heating modes and for automatically controlling operation of the corresponding system 10, 100, 200 to take advantage of off-peak electricity pricing whereupon the corresponding system 10, 100, 200 is operated in a selected mode which is appropriate for peak or off-peak energy pricing, as well as for the heating or cooling load requirements.

Control device 300 receives various control inputs, such as from an indoor space thermostat 302 and a tank thermostat 304. Thermostat 302 indicates a demand for space cooling or space heating when the space temperature rises above or falls below a predetermined temperature setpoint. Tank thermostat 304 senses the temperature of the storage medium in the thermal energy storage tank and control device 300 uses this input to control the various modes of operation of the corresponding system 10, 100, 200. Control device 300 may also receive other control inputs, such as signals from a local utility.

Although various embodiments of the invention have been described in detail herein, those skilled in the art will also recognize that various substitutions and modifications may be made to the above-described embodiments without departing from the scope and spirit of the invention, as recited in the appended claims.

I claim:

1. An air conditioning system, comprising:

a compressor for compressing a first refrigerant, the first refrigerant being a compressible phase change fluid;

a first heat exchanger operably connected to said compressor;

a second heat exchanger operably connected to said first heat exchanger and to said compressor, said second heat exchanger being in heat exchange relationship with a supply air stream for an indoor space, said compressor being operable to circulate the first refrigerant between said first heat exchanger and said second heat exchanger, whereby the supply air stream is cooled;

a thermal energy storage unit including a tank having a thermal energy storage medium disposed therein;

a third heat exchanger operably connected to said tank, said compressor and sail first heat exchanger, said compressor being operable to circulate the first refrigerant between said first heat exchanger and said third heat exchanger, whereby a second refrigerant in heat exchange relationship with the first refrigerant in said third heat exchanger is cooled, the second refrigerant being a substantially incompressible liquid;

a fourth heat exchanger operably connected to said third heat exchanger, said fourth heat exchanger being in heat exchange relationship with the supply air stream;

a refrigerant circulation device for circulating the second refrigerant between said third heat exchanger and said tank, whereby the storage medium is cooled, said refrigerant circulation device being further operable to circulate the second refrigerant between said third heat exchanger and said fourth heat exchanger, whereby the supply air stream is cooled; and a control device adapted to effect flow of the first refrigerant through a first circuit comprising said compressor, said first heat exchanger and said second heat exchanger, and through a second circuit comprising said compressor, said first heat exchanger and said third heat exchanger, said flow control device being operable to effect flow of the second refrigerant through a third circuit comprising said third heat exchanger, said refrigerant circulation device and said tank, and through a fourth circuit comprising said third heat exchanger, said refrigerant circulation device and said fourth heat exchanger, said system being selectively operable in a first operating mode wherein the first refrigerant flows through said second circuit and the second refrigerant flows through said third circuit to cool the storage medium, in a second operating mode wherein the first refrigerant flows through said first circuit to cool the supply air stream with said second heat exchanger, in a third operating mode wherein the second refrigerant flows through said fourth circuit to cool the supply air stream with said fourth heat exchanger, and in a fourth operating mode wherein the first refrigerant flows through said first circuit and the second refrigerant flows through said fourth circuit to cool the supply air stream with both said second heat exchanger and said fourth heat exchanger.

2. The system of claim 1 wherein the storage medium is water and the second refrigerant is a liquid having a lower freezing point than the storage medium.

3. The system of claim 1 wherein the storage medium is deionized water encapsulated in a plurality of containers within said tank.

4. The system of claim 1 wherein said third heat exchanger is external to said tank, said system further including a fifth heat exchanger immersed in the storage medium within said tank for effecting heat transfer between the second refrigerant and the storage medium.

5. The system of claim 1 further including flow reversing means operably connected to said compressor for reversing the flow of the first refrigerant in said first circuit to provide heated first refrigerant to said second heat exchanger for heating the supply air stream with said second heat exchanger when the first refrigerant flows through said first circuit in one direction and to provide cooled first refrigerant to said second heat exchanger for cooling the supply air stream with said second heat exchanger when the first refrigerant flows through said first circuit in an opposite direction.

6. The system of claim 1 further including a heating device for heating the storage medium to provide heated second refrigerant in said fourth circuit for heating the supply air stream with said fourth heat exchanger when the second refrigerant flows through said fourth circuit.

7. The system of claim 1 further including at least one isolation valve interposed in said system for isolating said third circuit from said fourth circuit.

8. The system of claim 1 wherein said third heat exchanger is external to said tank.

9. An air conditioning system comprising:

a compressor, a first heat exchanger and a second heat exchanger operably interconnected to define a first circuit, said second heat exchanger being in heat exchange relationship with a supply air stream for an indoor space;

a thermal energy storage unit including a tank containing a thermal energy storage medium;

a third heat exchanger operably interconnected with said tank, said compresser and said first heat exchanger to define a second circuit;

a refrigerant circulation device operably interconnected with said third heat exchanger and said tank to define a third circuit;

a fourth heat exchanger operably interconnected with said tank and said refrigerant circulation device to define a fourth circuit, said fourth heat exchanger being in heat exchange relationship with the supply air stream; and a control device adapted to selectively control operation of said compressor to effect flow of a first refrigerant in said first circuit for cooling the supply air stream with said second heat exchanger, to control said compressor to effect flow of the first refrigerant in said second circuit and said refrigerant circulation device to effect flow of a second refrigerant in said third circuit simultaneously with the flow of the first refrigerant in said second circuit, whereby the second refrigerant is cooled by the first refrigerant and the storage medium is cooled by the second refrigerant, and to control said refrigerant circulation device to circulate the second refrigerant in said fourth circuit for cooling the supply air stream with said fourth heat exchanger, the first refrigerant being a compressible phase change fluid and the second refrigerant being a substantially incompressible liquid.

10. The system of claim 9 wherein said control device is adapted to control said compressor and said refrigerant circulation device to simultaneously circulate the first refrigerant in said first circuit and the second refrigerant in said fourth circuit for cooling the supply air stream with both said second heat exchanger and said fourth heat exchanger.

11. The system of claim 9 wherein said first heat exchanger is an outdoor heat exchanger which is operable as a condenser and said second and fourth heat exchangers are indoor heat exchangers operable as evaporators for cooling the supply air stream.

12. The system of claim 9 further including flow reversing means operably connected to said compressor for reversing the flow of the first refrigerant in said first circuit to provide heated first refrigerant to said second heat exchanger for heating the supply air stream with said second heat exchanger when the first refrigerant flows through said first circuit in one direction and to provide cooled first refrigerant to said second heat exchanger for cooling the supply air stream with said second heat exchanger when the first refrigerant flows through said first circuit in an opposite direction.

13. The system of claim 9 further including a heating device for heating the storage medium to provide heated second refrigerant in said fourth circuit for heating the supply air stream with said fourth heat exchanger when the second refrigerant flows through said fourth circuit.

14. The system of claim 9 further including at least one isolation valve interposed in said system for isolating said third circuit from said fourth circuit.

15. The system of claim 9 wherein the storage medium is water and the second refrigerant is a liquid having a lower freezing point than the storage medium.

16. The system of claim 9 wherein the storage medium is deionized water encapsulated in a plurality of containers within said tank.

17. A method of operating the air conditioning system of claim 9 to reduce the consumption of electric power during periods of peak power demand, said method comprising the steps of:

circulating the first refrigerant through said second circuit and the second refrigerant through said third circuit during a period of non-peak power demand to cool the storage medium; and circulating the second refrigerant through said fourth circuit during a period of peak power demand to cool the supply air stream with said fourth heat exchanger.

18. The method of operating the air conditioning system as set forth in claim 17, further including operating said compressor to circulate the first refrigerant through the first circuit while continuing to circulate the second refrigerant through the fourth circuit to cool the supply air stream with said second and fourth heat exchangers simultaneously.

19. A method of operating the air conditioning system of claim 9 to provide heating, comprising heating the storage medium and circulating the second refrigerant through said fourth circuit to heat the supply air stream with said fourth heat exchanger.

20. The method of operating the air conditioning system as set forth in claim 19, further including circulating the first refrigerant through said first circuit to condense the first refrigerant in said second heat exchanger and evaporate the first refrigerant in said first heat exchanger to heat the supply air stream with said second heat exchanger.

21. The method of operating the air conditioning system as set forth in claim 20, including simultaneously circulating the first refrigerant in said first circuit and the second refrigerant in said fourth circuit to heat the supply air stream with said second and fourth heat exchangers.

22. The system of claim 9 wherein said third heat exchanger is external to said tank.

23. The system of claim 22 further including a fifth heat exchanger immersed in the storage medium within said tank for effecting heat transfer between the second refrigerant and the storage medium.

24. An air conditioning system comprising:

a compressor, a first heat exchanger and a second heat exchanger operably interconnected to define a first circuit, said second heat exchanger being in heat exchange relationship with a supply air stream for an indoor space;

a thermal energy storage unit including a tank containing a thermal energy storage medium;

a third-heat exchanger external to said tank and operably interconnected with said tank, said compressor and said first heat exchanger to define a second circuit;

a refrigerant circulation device operably interconnected with said third heat exchanger and said tank to define a third circuit;

a fourth heat exchanger operably interconnected with said tank and said refrigerant circulation device to define a fourth circuit, said fourth heat exchanger being in heat exchange relationship with the supply air stream; and a control device adapted to selectively control operation of said compressor to effect flow of a first refrigerant in said first circuit for cooling the supply air stream with said second heat exchanger, to control said compressor to effect flow of the first refrigerant in said second circuit and said refrigerant circulation device to effect flow of a second refrigerant in said third circuit simultaneously with the flow of the first refrigerant in said second circuit, whereby the second refrigerant is cooled by the first refrigerant and the storage medium is cooled by the second refrigerant, and to control said refrigerant circulation device to circulate the second refrigerant in said fourth circuit for cooling the supply air stream with said fourth heat exchanger.

25. The system of claim 24 wherein said control device is adapted to control said compressor and said refrigerant circulation device to simultaneously circulate the first refrigerant in said first circuit and the second refrigerant in said fourth circuit for cooling the supply air stream with both said second heat exchanger and said fourth heat exchanger.

26. The system of claim 24 wherein said first heat exchanger is an outdoor heat exchanger which is operable as a condenser and said second and fourth heat exchangers are indoor heat exchangers operable to cool the supply air stream.

27. The system of claim 24 further including flow reversing means operably connected to said compressor for reversing the flow of the first refrigerant in said first circuit to provide heated refrigerant to said second heat exchanger for heating the supply air stream with said second heat exchanger when the first refrigerant flows through said first circuit in one direction and to provide cooled first refrigerant to said second heat exchanger for cooling the supply air stream with said second heat exchanger when the first refrigerant flows through said first circuit in an opposite direction.

28. The system of claim 24 further including a heating device for heating the storage medium to provide heated second refrigerant in said fourth circuit for heating the supply air stream with said fourth heat exchanger when the second refrigerant flows through said fourth circuit.

29. The system of claim 24 further including at least one isolation valve interposed in said system for isolating said third circuit from said fourth circuit.

30. The system of claim 24 wherein the storage medium is water and the second refrigerant is a liquid having a lower freezing point than the storage medium.

31. The system of claim 24 wherein the storage medium is deionized water encapsulated in a plurality of containers within said tank.

32. The system of claim 24 further including a fifth heat exchanger located within said tank for effecting heat transfer between the second refrigerant and the storage medium.

* * * * *